United States Patent

United States Patent [19]
Rabener et al.

[11] Patent Number: 4,716,185
[45] Date of Patent: Dec. 29, 1987

[54] CURABLE MIXTURES BASED ON DIGLYCIDYL COMPOUNDS AND METAL COMPLEX COMPOUNDS

[75] Inventors: Claus W. Rabener, Oetlingen; Hans-Peter Hörner, Wehr, both of Fed. Rep. of Germany; Dieter Baumann, Möhlin, Switzerland

[73] Assignee: Ciba-Geigy Corporation, Ardsley, N.Y.

[21] Appl. No.: 3,969

[22] Filed: Jan. 16, 1987

[30] Foreign Application Priority Data

Jan. 17, 1986 [CH] Switzerland ............ 191/86-3
Nov. 19, 1986 [CH] Switzerland ............ 4616/86-7

[51] Int. Cl.$^4$ ............................................ C08G 59/68
[52] U.S. Cl. .................................. 523/456; 528/89; 528/91; 528/92; 528/398; 528/409; 528/414
[58] Field of Search .............. 528/89, 91, 92, 398, 528/409, 414; 523/456

[56] References Cited

U.S. PATENT DOCUMENTS

| 4,026,858 | 5/1977 | Andrews et al. | 528/92 X |
| 4,316,006 | 2/1982 | McEwen | 528/92 X |
| 4,321,351 | 3/1982 | Zuppinger et al. | 528/91 |
| 4,336,167 | 6/1982 | Reeh et al. | 523/451 |
| 4,365,052 | 12/1982 | Reeh et al. | 528/92 |
| 4,396,754 | 8/1983 | Brownscombe | 528/89 X |

FOREIGN PATENT DOCUMENTS 3151540  8/1982  Fed. Rep. of Germany .

Primary Examiner—Earl Nielsen
Attorney, Agent, or Firm—Luther A. R. Hall

[57] ABSTRACT

Curable mixtures, containing,
(a) at least one bisphenol diglycidyl ether based on bisphenol A, hydrogenated bisphenol A or bisphenol F,
(b) as a curing catalyst, a colorless or slightly yellow solution of a metal complex compound of the formula I

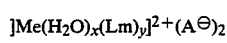 (I), in which
Me is a divalent metal from the group comprising Zn, Cd, Sn, Pb, Ca or Mg,
Lm is a saturated cyclic ether having 5 to 7 ring atoms, a linear or cyclic saturated aliphatic ether compound or a mixture of the ether and the ether compound, the ether and the ether compound having a boiling point of at least 60° C., and
A is an anion of the formula $BF_4^\ominus$, $PF_6^\ominus$, $AsF_6^\ominus$ or $SbF_6^\ominus$,
x is the number 4, 5 or 6 and y is zero or the number 1 or 2, the sum of x and y always being 6, the complex being dissolved in an excess of the corresponding ether or the corresponding ether compound,
(c) a sterically hindered mononuclear or polynuclear phenol, a phosphite of the formula II or III

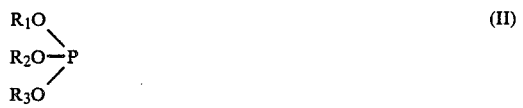 (II)

or

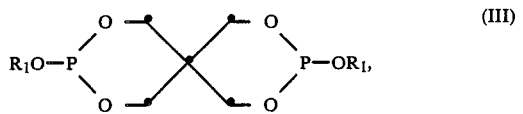 (III)

in which $R_1$, $R_2$ and $R_3$ independently of one another are each phenyl, alkyl-substituted phenyl having 1–12 carbon atoms in the alkyl radical or alkyl having 1 to 20 carbon atoms, or a mixture of a sterically hindered mononuclear or polynuclear phenol and a phosphite of the formula II or III and, if appropriate,
(d) as a reactive diluent, up to 25 parts by weight, relative to 100 parts by weight (a), of at least one diglycidyl ether of 1,4-butanediol, 1,6-hexanediol or neopentyl glycol or a cresol glycidyl ether and, if appropriate,
(e) as an adhesion promoter, an organic silane, titanate or zirconate, can be cured rapidly and give transparent mouldings which are resistant to yellowing. They are particularly suitable for sheathing or embedding opto-electronic components.

17 Claims, No Drawings

CURABLE MIXTURES BASED ON DIGLYCIDYL COMPOUNDS AND METAL COMPLEX COMPOUNDS

The present invention relates to curable mixtures based on certain diglycidyl compounds and metal complex compounds and to their use as transparent molding and coating compositions, in particular for sheathing or embedding opto-electronic components.

Transparent casting resin compositions based on diglycidyl compounds for opto-electronic components are known, for example from German Offenlegungsschriften Nos. 3,016,097, 3,016,103 and 3,151,540. The casting resin compositions disclosed therein represent anhydride-curable epoxide resin compositions which have been provided with a curing accelerator. For certain applications, in particular for machine processing, such casting resin systems sometimes leave something to be desired with respect to mold occupation times.

It has now been found that casting resin compositions of certain bisphenol diglycidyl ethers and certain metal complex compounds can, on the one hand, be fully cured very rapidly, i.e. they have shorter gelling and initial curing times and thus allow very short mould occupation times, and, on the other hand, do not yellow either on curing or on storage.

The present invention thus relates to curable mixtures which contain (a) at least one bisphenol diglycidyl ether based on bisphenol A, hydrogenated bisphenol A or bisphenol F, (b) as a curing catalyst, a colorless or slightly yellow solution of a metal complex compound of the formula I

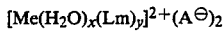 (I)

in which

Me is a divalent metal from the group comprising Zn, Cd, Sn, Pb, Ca or Mg,

Lm is a saturated cyclic ether having 5 to 7 ring atoms, a linear or cyclic saturated aliphatic ether compound or a mixture of the ether and the ether compound, the ether and the ether compound having a boiling point of at least 60° C., and A is an anion of the formula $BF_4^\ominus$, $PF_6^\ominus$, $AsF_6^\ominus$ or $SbF_6^\ominus$, x is the number 4, 5 or 6 and y is zero or the number 1 or 2, the sum of x and y always being 6, the complex being dissolved in an excess of the corresponding ether or the corresponding ether compound, (c) a sterically hindered mononuclear or polynuclear phenol, a phosphite of the formula II or III

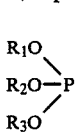 (II)

or

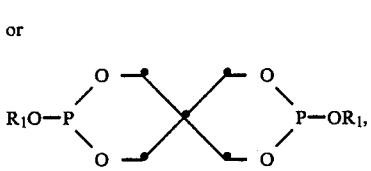 (III)

in which $R_1$, $R_2$ and $R_3$ independently of one another are each phenyl, alkyl-substituted phenyl having 1–12 carbon atoms in the alkyl radical or alkyl having 1 to 20 carbon atoms, or a mixture of a sterically hindered mononuclear or polynuclear phenol and a phosphite of the formula II or III and, if appropriate, (d) as a reactive diluent, up to 25 parts by weight, relative to 100 parts by weight of (a), of at least one diglycidyl ether of 1,4-butanediol, 1,6-hexanediol or neopentyl glycol or a cresol glycidyl ether and, if appropriate, (e) as an adhesion promoter, an organic silane, titanate or zirconate.

Preferably, the mixtures according to the invention contain, as the component (c) a sterically hindered mononuclear or polynuclear phenol and, as the reactive diluent (d), 15 parts by weight, relative to 100 parts by weight of (a), of at least one diglycidyl ether of 1,4-butanediol, 1,6-hexanediol or neopentyl glycol.

Moreover, the mixtures according to the invention preferably contain the components (a), (b), (c) and (d).

The component (a) in the mixtures according to the invention is preferably a bisphenol A diglycidyl ether, a hydrogenated bisphenol A diglycidyl ether or a mixture of a bisphenol A diglycidyl ether and a bisphenol F diglycidyl ether, in particular a bisphenol A diglycidyl ether or a mixture of bisphenol A and bisphenol F diglycidyl ethers.

As the metal complex compound (b), the mixtures according to the invention preferably contain those in which, in the formula I, Me is Zn and A is $BF_4^\ominus$.

In the formula I, examples of suitable saturated cyclic ethers having 5 to 7 ring atoms are tetrahydrofuran, tetrahydropyran, 1,3-dioxolane or hexamethylene oxide.

Examples of suitable linear saturated aliphatic ether compounds are diethylene glycol dimethyl ether (diglyme), diethylene glycol diethyl ether, diethylene glycol di-n-butyl ether, triethylene glycol dimethyl ether (triglyme), triethylene glycol diethyl ether, triethylene glycol di-n-butyl ether, tetraethylene glycol dimethyl ether (tetraglyme), 2-ethoxyethanol, and examples of suitable cyclic saturated ether compounds are tetrahydrofurfuryl alcohol, bis-tetrahydrofurfuryl ether and 2-tetrahydrofurfuryloxy-tetrahydropyran.

Preferably, Lm in the formula I is a saturated cyclic ether or a linear saturated aliphatic ether compound, and in particular Lm is tetrahydrofuran, hexamethylene oxide or triglyme.

Those complex compounds in which, in the formula I, x is 4 and y is 2, are also preferred in the mixtures according to the invention.

The metal complex compounds, used as curing catalysts, of the formula I are usually employed in catalytic quantities. Preferably, the quantity used is 0.01 to 5 parts by weight, in particular 0.05 to 3.5 parts by weight, per 100 parts by weight of bisphenol diglycidyl ether (a). As a rule, the curing catalysts are used as a 1–10 percent by weight solution, preferably as a 5–10 percent by weight solution, the ether compound in the metal complex and the ether used as solvent being normally identical.

The metal complex compounds of the formula I are known compounds and can be prepared analogously to the process disclosed in EP patent No. 0,028,583 by, for example, reacting a metal fluoride with $BF_3$, $PF_5$, $AsF_5$ or $SbF_5$ in the presence of a stoichiometric quantity of water in a complexing ether or a complexing ether compound (Lm) at an elevated temperature.

The following are examples of compounds which can be added as the sterically hindered mononuclear or polynuclear phenols (c) to the mixture according to the invention: 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-isobutylphenol, 2,6-dicyclopentyl-4-methylphenol, 2-(α-methylcyclohexyl)-4,6-dimethylphenol, 2,6-di-octadecyl-4-methylphenol, 2,4,6-tricyclohexylphenol, 2,6-di-tert.-butyl-4-methoxymethylphenol, 2,6-di-tert.-butyl-4-methoxyphenol, 2,6-diphenyl-4-octadecyloxyphenol, 2,2'-thio-bis-(6-tert.-butyl4-methylphenol), 2,2'-thio-bis-(4-octylphenol), 4,4'-thio-bis-(6-tert.-butyl-3-methylphenol), 4,4'-thio-bis-(6-tert.-butyl-2-methylphenol), 2,2'-methylene-bis-(6-tert.-butyl-4-methylphenol), 2,2'-methylene-bis-(6-tert.-butyl-4-ethylphenol), 2,2'-methylene-bis-[4-methyl-6-(α-methylcyclohexyl)phenol], 2,2'-methylene-bis-(4-methyl-6-cyclohexylphenol), 2,2'-methylene-bis-(6-nonyl-4-methylphenol), 2,2-methylene-bis-(4,6-di-tert.-butylphenol), 2,2'-ethylidene-bis-(4,6-di-tert.-butylphenol), 2,2'-ethylidene-bis-(6-tert.-butyl-4-isobutylphenol), 2,2'-methylene-bis-[6-(α-methylbenzyl)-4-nonylphenol], 2,2'-methylene-bis-[6-(α,α-dimethylbenzyl)-4-nonylphenol], 4,4'-methylene-bis-(2,6-di-tert.-butylphenol), 4,4'-methylene-bis-(6-tert.-butyl-2-methylphenol), 1,1-bis-(5-tert.-butyl-4-hydroxy-methyl-phenyl)-butane, 2,6-di-(3-tert.-butyl-5-methyl-2-hydroxybenzyl) -4-methylphenol, 1,1,3-tris-(5-tert.-butyl-4-hydroxy-2-methylphenyl)-butane, 1,1-bis-(5-tert. -butyl-4-hydroxy-2-methylphenyl)-3-n-dodecyl-mercaptobutane, ethylene glycol bis-[3,3-bis-(3'-tert.-butyl-4'-hydroxyphenyl)-butyrate], di-(3-tert.-butyl-4-hydroxy-5-methylphenyl)-dicyclopentadiene, di-[2-(3'-tert.-butyl-2'-hydroxy -5'-methylbenzyl)-6-tert.-butyl-4-methylphenyl] terephthalate, 1,3,5-tri(3,5-di-tert.-butyl-4-hydroxybenzyl)2,4,6-trimethylbenzene, di-(3,5-di-tert.-butyl-4-hydroxybenzyl) sulfide, isooctyl 3,5-di-tert.-butyl-4-hydroxybenzyl-mercaptoacetate, bis-(4-tert.-butyl-3-hydroxy-2,6-dimethylbenzyl) dithiol-terephthalate, 1,3,5-tris-(3,5-di-tert.-butyl-4-hydroxybenzyl) isocyanurate, 1,3,5-tris-(4-tert.-butyl -3-hydroxy-2,6-dimethylbenzyl) isocyanurate, dioctadecyl 3,5-di-tert.-butyl-4-hydroxybenzylphosphonate, monoethyl 3,5-di-tert.-butyl-4-hydroxybenzylphosphonate, 2,4-bis-octylmercapto-6-(3,5-di-tert.-butyl-4-hydroxyanilino)-striazine, octyl N-2,5-di-tert.-butyl-4-hydroxyphenyl-carbamate and esters of β-(3,5-di-tert.-butyl-4-hydroxyphenyl)-propionic acid with monohydric or polyhydric alcohols such as methanol, octadecanol, 1,6-hexanediol, neopentyl glycol, diethylene glycol, triethylene glycol, pentaerythritol or tris-hydroxyethyl isocyanurate, for example pentaerythrityl tetrakis-[3-(3,5-di-tert.-butyl-4-hydroxyphenyl)-propionate], and also esters of β-(5-tert.-butyl-4-hydroxy-3-methylphenyl)-propionic acid with monohydric or polyhydric alcohols.

The above phenols are known compounds, some of which are commercially available.

Preferably, those phenols are used in the mixtures according to the invention which carry a tert.-butyl group in each of the two ortho-positions to the phenolic hydroxyl group. Amongst such phenols, the polynuclear phenols containing tert.-butyl groups are particularly preferred phenols for the mixtures according to the invention.

The sterically hindered phenols are added to the mixtures according to the invention in general in quantities of 0.2 to 5 parts by weight per 100 parts by weight of bisphenol diglycidyl ether (a). Preferably, the quantity is 0.4 to 3 parts by weight, especially 0.5 to 2.5 parts by weight, of sterically hindered phenol per 100 parts of bisphenol diglycidyl ether (a).

In place of the said phenols, the curable mixtures according to the invention can also contain phosphites of the formula II or mixtures of the said phenols and the phosphites of the formula II in the same quantities by weight, relative to component (a).

As the phosphites of the formula II, the mixtures according to the invention contain, for example, triphenyl phosphite, tris-(2,4-di-tert.-butylphenyl) phosphite, tris-(p-nonylphenyl) phosphite, di-(hexyl) phenyl phosphite, di-(heptyl) phenyl phosphite, di-(octyl) phenyl phosphite, di-(nonyl) phenyl phosphite, di-(decyl) phenyl phosphite, di-(undecyl) phenyl phosphite or di-(dodecyl) phenyl phosphite, and examples of suitable phosphites of the formula III are distearyl pentaerythritol diphosphite and di-(di2,4,tert.-butylphenyl) pentaerythritol diphosphite.

Those phosphites of the formula II are preferably used in which $R_1$ is phenyl and $R_2$ and $R_3$ are each alkyl having 1 to 12 and especially 6 to 12 carbon atoms.

The phosphites of the formula II and III are known compounds, and some of them are commercially available.

The diglycidyl compounds which can be used as reactive diluents (d) in the mixtures according to the invention are known compounds and are preferably added to the curable compounds when their processing requires a viscosity of less than 1200 mPas for example for processing as an injection-molding compound. Preferably, hexanediol diglycidyl ether or butanediol diglycidyl ether, in particular hexanediol diglycidyl ether, are used as the reactive diluent.

Examples of silanes which, if appropriate, can be added as adhesion promoters (e) to the mixtures according to the invention are: vinyltriethoxysilane, vinyltrimethoxysilane, vinyl-tris-(β-methoxyethoxy)-silane, γ-methacryloxypropyl-trimethoxysilane, γ-methacryloxypropyl-tris-(2- methoxyethoxy)-silane, β-(3,4-epoxycyclohexyl)-ethyl-trimethoxysilane, γ-glycidoxypropyl-trimethoxysilane, vinyltriacetoxysilane, γ-mercaptopropyl-trimethoxysilane, γ-aminopropyl-triethoxysilane and N-(β-aminoethyl)-γ-aminopropyltrimethoxysilane.

Such compounds are known and are commercially available as silane adhesion promoters from Union Carbide corporation.

Examples of suitable inorganic titanates which can be added, if appropriate, as adhesion promoters (e) to the mixtures according to the invention are the following compounds: isopropyl triisostearoyl titanate, isopropyl dimethacryloyl isostearoyl titanate, isopropyl tri-(dodecylbenzenesulfonyl) titanate, isopropyl tri-(dioctylphosphato) titanate, isopropyl 4-aminobenzenesulfonyl di-(dodecylbenzenesulfonyl) titanate, alkoxy trimethacryl titanate, isopropyl tri-(dioctylpyrophosphato) titanate, alkoxy triacryl titanate, isopropyl tri-(N-ethylamino-ethylamino)-titanate, titanates of the oxyacetate chelate type, for example titanium di-(cumylphenylate) oxyacetate or titanium di-(dioctylpyrophosphate) oxyacetate, titanates of the ethylene chelate type, for example di-(dioctylphosphato) ethylene titanate or di-(dioctylpyrophosphato) ethylene titanate, or cyclic titanates, for example dicyclo-(dioctyl)-pyrophosphato dioctyl titanate or dicyclo-(dioctyl)-pyrophosphato titanate.

The said titanates are also known compounds and are commercially available from Kenrich Petrochemicals.

Examples of suitable organic zirconates which, if appropriate, can be added as adhesion promoters (e) to the mixtures according to the invention are neoalkoxy tris(neodecanoyl) zirconate, neoalkoxy tris-(dodecylbenzenesulfonyl) zirconate, neoalkoxy tris-(dioctyl)-phosphato zirconate, neoalkoxy tris-(dioctyl)-pyrophosphato zirconate, neoalkoxy tris-(ethylenediamino)-ethyl zirconate or neoalkoxy tris-(m-amino)-phenyl zirconate. Such compounds are likewise known and commercially available from Kenrich Petrochemicals.

The adhesion promoters present, if appropriate, in the mixtures according to the invention are in general added in quantities of 0.05–0.5 part by weight, preferably 0.01–0.3 and especially 0.01–0.1 part by weight, per 100 parts by weight of the bisphenol diglycidyl ether (a). Amongst the said adhesion promoters, the organic silanes are used preferably, in particular those which contain an epoxide group.

Depending on the application, yet further additives can be added to the mixtures according to the invention, such as levelling agents to obtain better surfaces in coatings or so-called deaerators in order to remove occluded air bubbles from the curable mixture before curing. Levelling agents are commercially available for example under the name "Silwett L-77" or "L 76023" from UCC, "Fluorad FC-430" from 3M or "Additol XL 490/100" from Vianova Kunstharz AG. Deaerating agents are likewise on the market, for example under the name "Silicone-SH" or "Silicone-SAG" from Wacker Chemie, "BYK 525" or "BYK A500" from BYK-Mallincrodt or "Anti-Mousse Rhodorsil 411" from Rhône Poulenc.

Moreover, the mixtures according to the invention can be provided in the known manner with coloring pastes, which must not adversely affect the transparence of the opto-electronic molding materials prepared from these mixtures. For applications in the opto-electronics field, diffuser pastes can, if appropriate, also be added to the mixtures according to the invention, in order to obtain adequate light scattering in the optoelectronic molding materials.

As mentioned at the outset, the mixtures according to the invention are transparent molding and coating compositions which in general can be cured in the temperature range from 100°–140° C. The gelling times of the mixtures according to the invention are between 5 and 30 seconds in this temperature range. Because of their transparence, yellowing resistance and processing properties, the mixtures according to the invention are particularly suitable for the production of opto-electronic components, such as light-emitting diodes, opto-couplers or displays. In this application, it is advantageous if the mixtures according to the invention have a color number of less than 2 on the Gardener scale before curing.

The present invention therefore also relates to the use of the mixtures according to the invention as encapsulation compositions or potting compounds for the production of opto-electronic components, and to opto-electronic components encapsulated or potted with the mixtures according to the invention.

The invention is explained in more detail in the examples which follow.

The test methods mentioned in the examples are carried out as follows.

Moist storage test: The fully cured light-emitting diodes are stored for 500 hours at 85° C. and a relative humidity of 85%. The voltage applied to the diodes is 4 V. The rise in the inverse current is measured. A diode is regarded as having failed when the current intensity rises to values greater than 10 $\mu$A.

Temperature shock test: The fully cured light-emitting diodes are alternatingly immersed for 15 minutes each time into a liquid cooled to $-10°$ C. and then into a liquid warmed to 90° C. 100 such cycles are carried out. Specimens have passed the test if no stress cracks appear in the fully cured molded material.

Preparation of the zinc tetrafluoborate complex in tetrahydrofuran (THF) Zn $(H_2O)_4$ $(THF)_2^{2+}$ $(BF_4)_2$ 113.7 g of zinc fluoride (1 mol+10% excess) are dispersed at room temperature in 317.28 g of THF (4.4 mol) in a sulfonation flask provided with a thermometer, dropping funnel, stirrer and gas inlet tube. Under a slow stream of argon, 207.68 g of $BF_3.2H_2O$ (2 mol) are added dropwise in the course of 2 hours in such a way that the reaction temperature does not rise above 50° C. Reaction is then allowed to continue in the reaction mixture for a further 2 hours. 20 g of filter aid are then added at 30° C. with stirring, and the reaction mixture is filtered with suction over a soft filter, with argon blanketing. This gives the zinc complex in a light yellow, highly viscous solution in 91% yield. The zinc content is 101.2 mg of Zn per 1 g of solution.

Preparation of the zinc tetrafluoborate complex in triethylene glycol dimethyl ether (triglyme)

103.4 g (1 mol) of zinc fluoride are dispersed at room temperature by stirring in 178.22 g (1 mol) of triglyme in a sulfonation flask provided with a thermometer, dropping funnel, stirrer and gas inlet tube. Under a slow stream of argon, 206.68 g of $BF_3.2H_2O$ are added dropwise in the course of 4 hours in such a way that the reaction temperature does not exceed 60° C. Reaction is then allowed to continue at 50° C. for a further 2 hours. The turbid suspension is filtered overnight over a small $Al_2O_3$ column.

This gives a clear liquid of medium viscosity with a zinc content of 126 mg of Zn per 1 g of solution.

Preparation of the zinc tetrafluoborate complex in hexamethylene oxide 99.2 g (0.96 mol) of zinc fluoride are dispersed at room temperature by stirring in 384.6 g (3.84 mol) of hexamethylene oxide in a sulfonation flask provided with a thermometer, dropping funnel, stirrer and gas inlet tube. Under a slow stream of argon, 199.3 g (1.92 mol) of $BF_3.2H_2O$ are added dropwise in such a way that the reaction temperature does not exceed 60° C. The dropwise addition is complete after 4 hours, and the reaction solution is heated to 60° C. and allowed to react for a further 2 hours. The brownish turbid solution is filtered over a short column with a layer of $Al_2O_3$ and active charcoal.

This gives 470.42 g of a clear, yellow liquid of low viscosity.

EXAMPLE 1

100 parts by weight of a bisphenol A diglycidyl ether resin having an epoxide content of 5.6–5.7 equivalents/kg and 10 parts by weight of 1,6-hexanediol diglycidyl ether having an epoxide content of 6.4–6.6 equivalents/kg are mixed at room temperature by means of a laboratory stirrer. The temperature of this resin mixture is then raised to 80° C. and, at this temperature, one part by weight of pentaerythrityl tetrakis-[3-(3,5-di-tert.-butyl-4-hydroxyphenyl)-propionate] is stirred in over 20–30 minutes. The mixture is then allowed to cool again to room temperature.

100 parts by weight of the previously prepared mixture are then mixed at room temperature with 2 parts by weight of a zinc tetrafluoborate complex in tetrahydrofuran (Zn content 101.2 mg/g of solution). The gelling time of this reaction mixture is about 10 minutes at room temperature. Within one minute, the reaction mixture is injected by means of a plastic syringe into 25 cavities, consisting of a poly(methylpentene) thermoplastic of high heat distortion point, for light-emitting diodes and gelled and incipiently cured at 120° C. The gelling time is 20–25 seconds. After incipient curing for 1–2 minutes, the light-emitting diodes are removed from the cavities and then fully cured for a further 8 hours at 120° C. Colorless mouldings are then obtained which remain free of yellowing even after storage at 120° C. for 100 hours and have a glass transition point of 130°–140° C. The fully cured moldings pass both the moist storage test at 85° C./85% relative humidity for 500 hours and the temperature shock test (100 changes from −10° to +90° C.).

EXAMPLE 2

Example 1 is repeated, using the same quantity of 1,4-butanediol diglycidyl ether having an epoxide content of 8.9 equivalents/kg in place of the hexanediol diglycidyl ether. The properties of the mouldings obtained correspond to those of Example 1.

EXAMPLE 3

Example 1 is repeated, using the same quantity of neopentyl glycol diglycidyl ether having an epoxide content of 7.3 equivalents/kg in place of the hexanediol diglycidyl ether. The properties of the moldings obtained correspond to those of Example 1.

EXAMPLE 4

Example 1 is repeated, but with the difference that, in place of the bisphenol A diglycidyl ether resin having an epoxide content of 5.6/5.7 equivalents/kg, such a resin having an epoxide content of 5.1–5.4 epoxide equivalents/kg is used. The moldings obtained have the same properties as the moldings obtained according to Example 1.

EXAMPLE 5

Example 4 is repeated, using the same quantity of butanediol diglycidyl ether in place of the hexanediol diglycidyl ether. The properties of the moldings obtained correspond to those of Example 4.

EXAMPLE 6

Example 4 is repeated, using the same quantity of neopentyl diglycidyl ether in place of the hexanediol diglycidyl ether. The properties of the moldings obtained correspond to those of Example 4.

EXAMPLE 7

Example 1 is repeated, using the same quantity of distilled bisphenol F diglycidyl ether resin having an epoxide content of 6.0–6.4 equivalents/kg in place of the bisphenol A diglycidyl ether resin. The properties of the moldings obtained correspond to those of Example 1.

EXAMPLE 8

Example 7 is repeated, using the same quantity of butanediol diglycidyl ether in place of the hexanediol diglycidyl ether. The properties of the moldings obtained correspond to those of Example 7.

EXAMPLE 9

Example 7 is repeated, using the same quantity of neopentyl glycol diglycidyl ether in place of hexanediol diglycidyl ether. The properties of the moldings obtained correspond to those of Example 7.

EXAMPLE 10

Example 1 is repeated, using the same quantity of hydrogenated bisphenol A diglycidyl ether resin having an epoxide content of 4.3–4.8 equivalents/kg in place of the bisphenol A diglycidyl ether resin. The properties of the moldings obtained correspond to those of Example 1.

EXAMPLE 11

Example 1 is repeated, using the same quantity of a mixture of 50 parts by weight of a bisphenol A diglycidyl ether resin having an epoxide content of 5.1–5.4 equivalents/kg and 50 parts by weight of a distilled bisphenol F diglycidyl ether resin having an epoxide content of 6.0–6.4 equivalents/kg in place of the bisphenol A diglycidyl ether resin. The properties of the moldings obtained correspond to those of Example 1.

EXAMPLE 12

Example 1 is repeated, using the same quantity of a mixture of 50 parts by weight of a bisphenol A diglycidyl ether resin having an epoxide content of 5.1–5.4 equivalents/kg and 50 parts by weight of a hydrogenated bisphenol A diglycidyl ether resin having an epoxide content of 4.3–4.8 equivalents/kg in place of the bisphenol A diglycidyl ether resin. The properties of the moldings obtained correspond to those of Example 1.

EXAMPLE 13

Example 1 is repeated, using a mixture of 55 parts by weight of a bisphenol A diglycidyl ether resin having an epoxide content of 5.1–5.4 equivalents/kg, 30 parts by weight of a distilled bisphenol F diglycidyl ether resin having an epoxide content of 6.0–6.4 equivalents/kg and 14 parts by weight of hexanediol diglycidyl ether in place of the bisphenol A diglycidyl ether resin and 10 parts by weight of hexanediol diglycidyl ether. The properties of the moldings correspond to those of Example 1.

EXAMPLE 14

Example 13 is repeated, 0.1 % by weight of γ-glycidyloxypropyl-trimethoxysilane also being added to the curable mixture. The properties of the moldings obtained correspond to those of Example 1.

EXAMPLE 15

Example 13 is repeated, using 14 parts by weight of butanediol glycidyl ether in place of the hexanediol glycidyl ether. At the same time, 2 parts by weight of the bisphenol A diglycidyl ether resin are replaced by the same quantity of cresol glycidyl ether. The viscosity of the reaction mixture is 600 mPas. The properties of the moldings obtained correspond to those of Example 1.

EXAMPLE 16

Example 15 is repeated, replacing 3 parts by weight of the bisphenol A diglycidyl ether resin by the same quantity of didecyl phenyl phosphite, the gelling time of the curable mixture at room temperature being extended from 15 to 75 minutes. At 120° C., the gelling and curing times correspond to those of Example 1. The moldings obtained have the same properties as those obtained according to Example 1.

EXAMPLE 17

Example 16 is repeated, using the same quantity of tris-(p-nonylphenyl) phosphite in place of didecyl phenyl phosphite. A 100 g batch of resin and curing agent gels at room temperature in 9 minutes. The gelling times at 100° and 120° C. are 40 and 20 seconds respectively. With the curing times given in Example 1, moldings are obtained which have have the same properties as the moldings according to Example 1.

EXAMPLE 18

Example 16 is repeated, using the same quantity of tris-(2,4-di-tert.-butylphenyl) phosphite in place of didecyl phenyl phosphite. A 100 g batch of resin and curing agent gels at room temperature in 6 minutes. The gelling times at 100° and 120° C. are 27 and 17 seconds respectively. When applying the curing conditions given in Example 1, moldings are obtained which have the same properties as the moldings according to Example 1.

What is claimed is:

1. A curable mixture, containing
(a) at least one bisphenol diglycidyl ether based on bisphenol a, hydrogenated bisphenol A or bisphenol F,
(b) as a curing catalyst, a colorless or slightly yellow solution of a metal complex compound of the formula I $$[Me(H_2O)_x(Lm)_y]^{2+} (A^{\ominus})_2 \quad (I),$$

in which
Me is a divalent metal from the group consisting of Zn, Cd, Sn, Pb, Ca or Mg,
Lm is a saturated cyclic ether having 5 to 7 ring atoms, a linear or cyclic saturated aliphatic ether compound or a mixture of the ether and the ether compound, the ether and the ether compound having a boiling point of at least 60° C., and
A is an anion of the formula $BF_4^{\ominus}$, $PF_6^{\ominus}$, $AsF_6^{\ominus}$ or $SbF_6^{\ominus}$,
x is the number 4, 5 or 6 and y is zero or the number 1 or 2, the sum of x and y always being 6, the complex being dissolved in an excess of the corresponding ether or the corresponding ether compound,
(c) a sterically hindered mononuclear or polynuclear phenol, a phosphite of the formula II or III

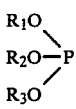

(II)

or

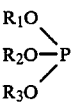

(II)

or

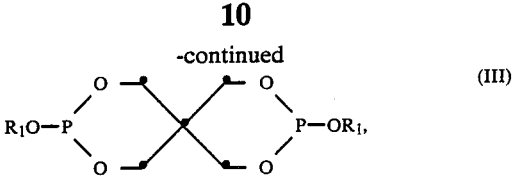

(III)

in which $R_1$, $R_2$ and $R_3$ independently of one another are each phenyl, alkyl-substituted phenyl having 1–12 carbon atoms in the alkyl radical or alkyl having 1 to 20 carbon atoms, or a mixture of a sterically hindered mononuclear or polynuclear phenol and a phosphite of the formula II or III and, optionally,
(d) as a reactive diluent, up to 25 parts by weight, relative to 100 parts by weight of (a), of at least one diglycidyl ether of 1,4-butanediol, 1,6-hexanediol or neopentyl glycol or a cresol glycidyl ether and, optionally,
(e) as an adhesion promoter, an organic silane, titanate or zirconate.

2. A mixture according to claim 1, containing, as the component (c) a sterically hindered mononuclear or polynuclear phenol and, as the reactive diluent (d), 15 parts by weight, relative to 100 parts by weight of (a), of at least one diglycidyl ether of 1,4-butanediol, 1,6-hexanediol or neopentyl glycol.

3. A mixture according to claim 1, containing components (a), (b), (c) and (d).

4. A mixture according to claim 1, which contains, as the component (a) a bisphenol A diglycidyl ether, a hydrogenated bisphenol A diglycidyl ether or a mixture of a bisphenol A diglycidyl ether and a bisphenol F diglycidyl ether.

5. A mixture according to claim 1, which contains, as a component (a), a bisphenol A diglycidyl ether or a mixture of a bisphenol A diglycidyl ether and a bisphenol F diglycidyl ether.

6. A mixture according to claim 1, which contains a metal complex compound of the formula I, in which Me is Zn.

7. A mixture according to claim 1, which contains a metal complex compound, in which Lm is a saturated cyclic ether or a linear saturated aliphatic ether compound.

8. A mixture according to claim 1, which contains a metal complex compound of the formula I, in which Lm is tetrahydrofuran, hexamethylene oxide or triethylene glycol dimethyl ether.

9. A mixture according to claim 1, which contains a metal complex compound of the formula I, in which A is $BF_4^{\ominus}$, x is 4 and y is 2.

10. A mixture according to claim 1, which contains, as the component (c), a phenol which has a tert.-butyl group in each of the two ortho-positions to the phenolic hydroxide group.

11. A mixture according to claim 1, which contains, as a component (c), a polynuclear phenol.

12. A mixture according to claim 1, which contains, as a component (c), a phosphite of the formula II or III -continued

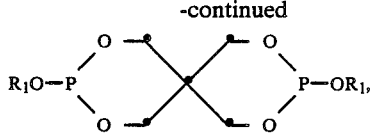
(III)

in which $R_1$, $R_2$ and $R_3$ independently of one another are each phenyl, alkyl-substituted phenyl having 1–12 carbon atoms in the alkyl radical or alkyl having 1–20 carbon atoms, or a mixture of a sterically hindered mononuclear or polynuclear phenol and a phosphite of the formula II or III.

13. A mixture according to claim 1, which contains, as a component (d), a hexanediol or butanediol diglycidyl ether.

14. A mixture according to claim 1, which contains, as a component (d), hexanediol diglycidyl ether.

15. A mixture according to claim 1, which contains, as a component (e), an organic silane.

16. A mixture according to claim 1, which contains, as a component (e), an organic silane with an epoxide group.

17. An opto-electronic component encapsulated or potted with a mixture of the invention, according to claim 1.

* * * * *